(12) United States Patent
Ryou et al.

(10) Patent No.: US 8,085,989 B2
(45) Date of Patent: Dec. 27, 2011

(54) METHOD AND APPARATUS FOR DETERMINING AUTHENTICITY

(75) Inventors: Kunihiro Ryou, Hyogo (JP); Shinichi Maeda, Hyogo (JP)

(73) Assignee: Glory Ltd., Himeji (JP)

( * ) Notice: Subject to any disclaimer, the term of this patent is extended or adjusted under 35 U.S.C. 154(b) by 682 days.

(21) Appl. No.: 12/256,733

(22) Filed: Oct. 23, 2008

(65) Prior Publication Data

US 2010/0104142 A1    Apr. 29, 2010

(51) Int. Cl.
*G06K 9/00* (2006.01)
*G06K 15/00* (2006.01)
(52) U.S. Cl. ......................... 382/112; 382/135; 358/1.14
(58) Field of Classification Search .................. 382/112, 382/113, 114, 135; 713/176; 358/1.14, 1.9, 358/518
See application file for complete search history.

(56) References Cited

U.S. PATENT DOCUMENTS

| 4,837,840 A * | 6/1989 | Goldman ...................... 382/135 |
| 7,627,161 B2 * | 12/2009 | Shimizu et al. ............... 382/135 |
| 7,862,140 B2 * | 1/2011 | Yoshida et al. ................ 347/19 |
| 2006/0222240 A1 * | 10/2006 | Hirota et al. .................. 382/162 |

FOREIGN PATENT DOCUMENTS

| JP | 2000-182114 | * 12/1998 |
| JP | 3501967 B2 | 12/2003 |

* cited by examiner

*Primary Examiner* — Vikkram Bali
*Assistant Examiner* — Nancy Bitar
(74) *Attorney, Agent, or Firm* — Foley & Lardner LLP

(57) ABSTRACT

In an authenticity determining apparatus, an image-data acquiring unit acquires image data of a paper sheet; a block-value calculating unit divides the image data into a plurality of blocks each composed of a plurality of pixels and calculates a block value of each of blocks; an average-block-value calculating unit calculates an average block value of blocks composing a predetermined area of the image data; a correction-block-value calculating unit calculates a corrected block value of each of the blocks by correcting each of the block values so that the average block value is equal to a predetermined reference value; and an authenticity determining unit that determines authenticity of the paper sheet based on whether each of corrected block values of the blocks composing the predetermined area is within a predetermined allowable numerical range that is preliminarily defined for the predetermined area.

12 Claims, 11 Drawing Sheets

FIG.4A
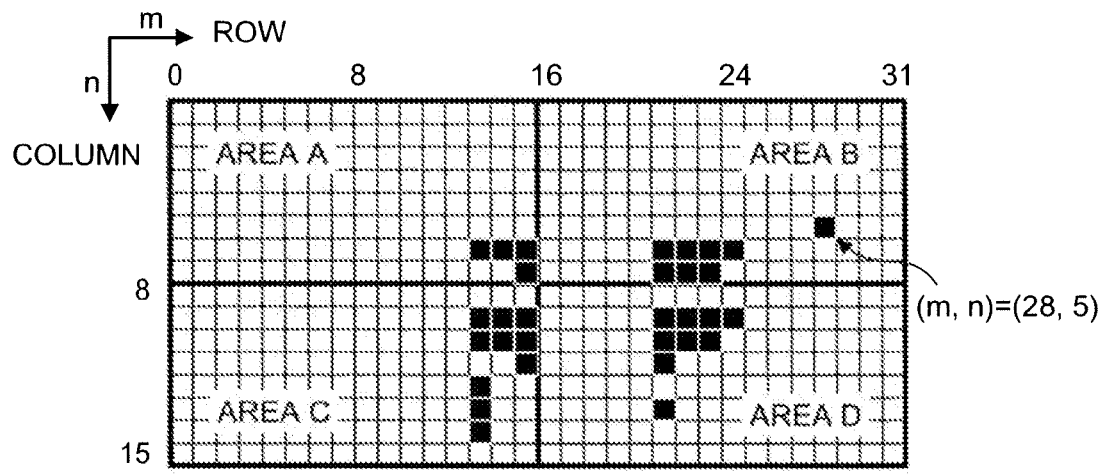
FIG.4B
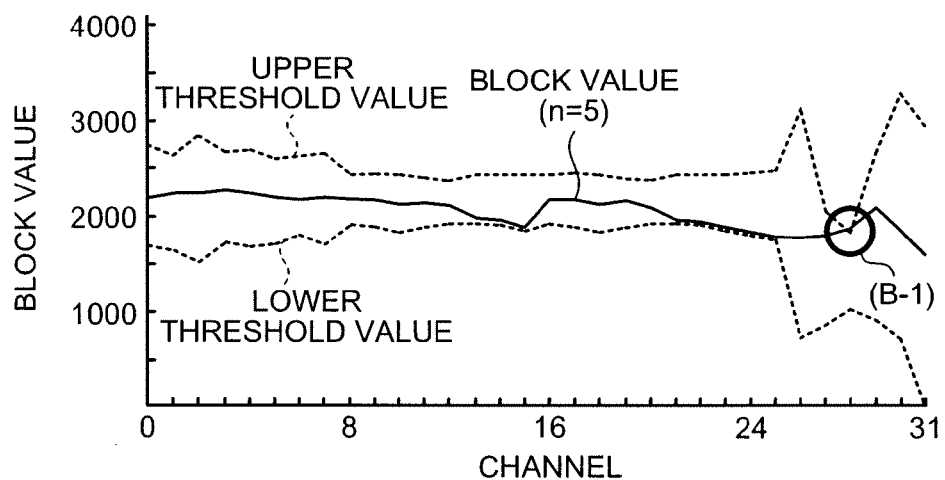
FIG.4C
|  | RESULT OF COUNTING | AVE | TOTAL | DETERMINATION THRESHOLD VALUE |
|---|---|---|---|---|
| AREA A | 4 | 1668 | 7875 | 5 |
| AREA B | 8 | 1474 | 23185 | 5 |
| AREA C | 10 | 1616 | 12526 | 5 |
| AREA D | 9 | 1441 | 20635 | 5 |

FIG.7

TABLE 1

| DIFFERENCE ($\beta - \alpha$) | CORRECTION RATIO OF BLOCK VALUE |
|---|---|
| + 1000 (3048) | × 0.9 |
| 0 (2048) | × 1.0 |
| − 1000 (1048) | × 1.1 |

TABLE 2

| DIFFERENCE ($\beta - \alpha$) | CORRECTION RATIO OF ALLOWABLE NUMERICAL RANGE |
|---|---|
| + 1000 (3048) | × 1.1 |
| 0 (2048) | × 1.0 |
| − 1000 (1048) | × 0.9 |

METHOD AND APPARATUS FOR DETERMINING AUTHENTICITY

BACKGROUND OF THE INVENTION

1. Field of the Invention

The present invention relates to a method and an apparatus for determining the authenticity of a printed paper sheet.

2. Description of the Related Art

A typical authenticity determining apparatus conveys a paper sheet such as a banknote with a conveying mechanism, and determines whether the paper sheet is authentic or counterfeit by using an optical sensor capable of emitting/receiving a light. The light can be a visible light or an infrared light. To determine whether a target paper sheet is authentic or counterfeit, the authenticity determining apparatus detects differences in the features between the target paper sheet and a reference authentic paper sheet.

Concretely, for example, image data of the surface of the target paper sheet is acquired by using an optical sensor, which can be a line sensor. The acquired image data is normalized, and then it is determined whether the features of the normalized image data match with those of the reference authentic paper sheet. In conjunction with the above-described normalization technique, such a technique that image data, which is composed of sets of pixels, is divided into a plurality of blocks, and the image data is treated as sets of representative values of those blocks is sometimes used. This technique produces an effect of reduction in the processing load.

Some image data have a high density contrast (hereinafter, "a high-contrast image data") while others have a low density contrast (hereinafter, "a low-contrast image data"). The normalization technique is effective for the high-contrast image data. However, because dispersion of data is disadvantageously emphasized when the low-contrast image data is normalized, the normalization technique is not effective for the low-contrast image data.

To cope with the problem, a technology for extracting features of a low-contrast image has been developed. For example, Japanese Patent No. 3501967 discloses such a technology that an image area in which contrast variation is low (i.e., a low-contrast image area) is detected with a microfilter as a differential filter. However, a processing load is high due to filtering by the microfilter.

In general, when the authenticity of a target paper sheet is to be determined, it is determined whether the feature value of image data of the target paper sheet after an image processing is within a numerical range of the same feature for the reference authentic paper sheet. If the image is a low-contrast image, such as an infrared image, the numerical range, i.e., a range between upper and lower threshold values needs to be narrowed. At this time, if the image data has an offset, even though the paper sheet is authentic, it is highly possible that the value of the feature falls out of the narrowed numerical range.

Incidentally, the "offset" means such a situation that overall data values of image data are increased/decreased due to fluctuations in an optical quality of a paper sheet, the sensitivity of sensor, the circuit adjustment, and the like.

Thus, there has been a requirement for a method and an apparatus capable of determining the authenticity of a paper sheet with low-contrast image, with high accuracy at low cost.

SUMMARY OF THE INVENTION

It is an object of the present invention to at least partially solve the problems in the conventional technology.

According to an aspect of the present invention, there is provided an authenticity determining apparatus that includes an image-data acquiring unit that acquires image data on an image of a paper sheet based on a reflected light from the paper sheet irradiated with an infrared light; a block-value calculating unit that divides the image data into a plurality of blocks each of which is composed of a plurality of pixels and calculates a block value of each of blocks; an average-block-value calculating unit that calculates an average block value of blocks in a predetermined area of the image data; a correction-block-value calculating unit that calculates a corrected block value of each of the blocks by correcting each of the block values so that the average block value is equal to a predetermined reference value; and an authenticity determining unit that determines authenticity of the paper sheet based on whether each of corrected block values of the blocks composing the predetermined area is within a predetermined allowable numerical range that is preliminarily defined for the predetermined area.

According to another aspect of the present invention, there is provided an authenticity determining method that includes acquiring image data on an image of a paper sheet based on a reflected light from the paper sheet irradiated with an infrared light; dividing the image data into a plurality of blocks each composed of a plurality of pixels and calculating a block value of each of blocks; first calculating including calculating an average block value of blocks composing a predetermined area of the image data; second calculating including calculating a corrected block value of each of the blocks by correcting each of the block values so that the average block value is equal to a predetermined reference value; and determining authenticity of the paper sheet based on whether each of corrected block values of the blocks composing the predetermined area is within a predetermined allowable numerical range that is preliminarily defined for the predetermined area.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 4A to 4C are diagrams for explaining an example of a relationship between block value and allowable numerical range;

FIG. 7 is a table of block-value correction coefficient and a table of allowable-numerical-range correction ratio;

DETAILED DESCRIPTION OF THE PREFERRED EMBODIMENTS

Exemplary embodiments of the present invention will be explained in detail below with reference to the accompanying drawings.

Figure 1:
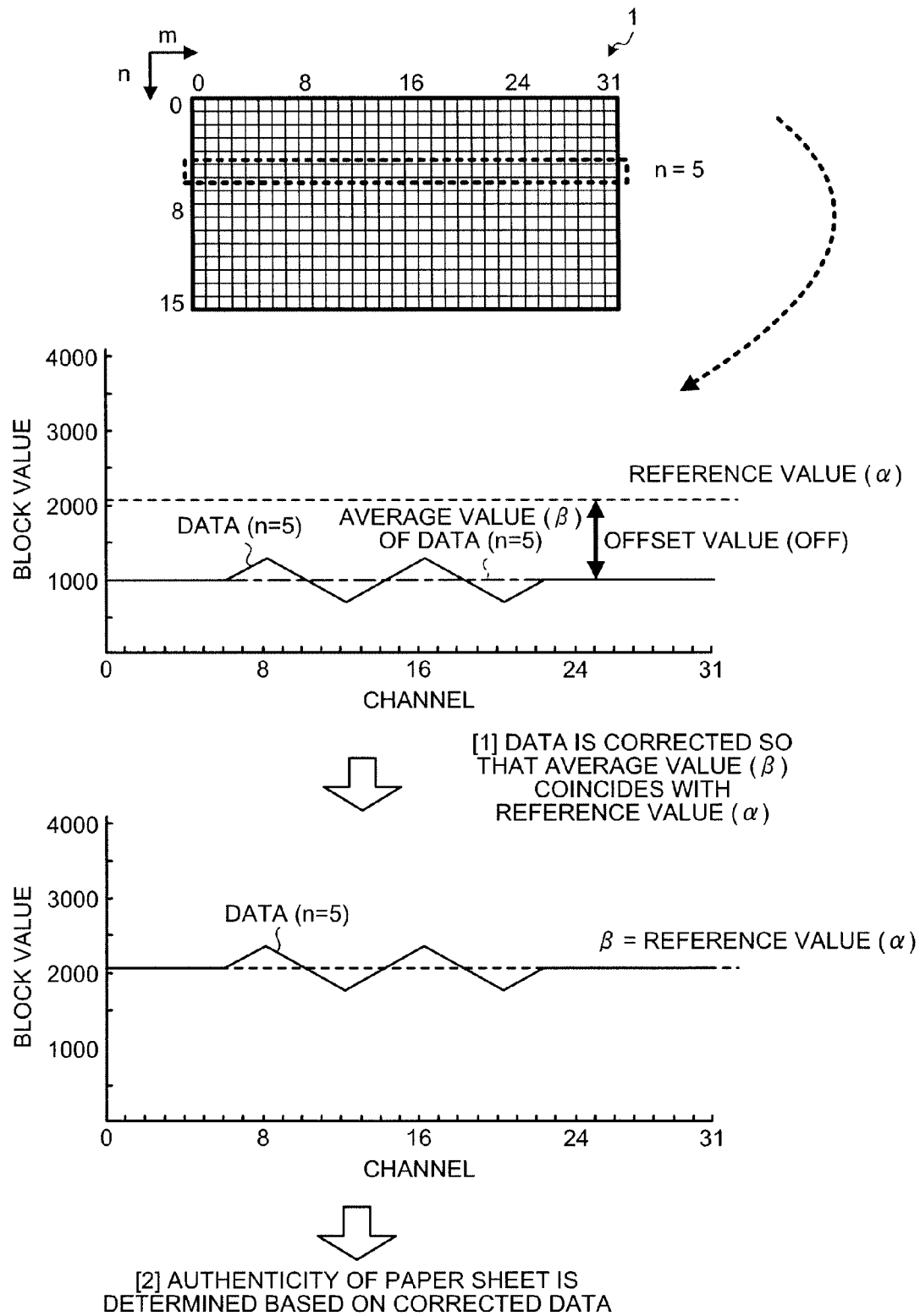
FIG. 1 is a schematic diagram for explaining an outline of an authenticity determining method according to the present invention.

First, an outline of an authenticity determining method according to the present invention will be explained below. FIG. 1 is a schematic diagram for explaining the outline of the authenticity determining method according to the present invention. As shown in FIG. 1, image data 1 is divided into 512 blocks: 32 blocks in rows (along an m-axis (m=0 to 31) and 16 blocks in columns (along an n-axis (n=0 to 15). It is assumed that each of the blocks is composed of the same number of pixels.

When a value of each of the blocks is expressed as a 12-bit binary number, each of the block values is within a range of 0 to 4095. A graph on the middle of FIG. 1 shows block values of 32 blocks in a line n=5 of the image data 1 An average value ($\beta$) of the block values of the 32 blocks in the line n=5 is 1000 (hereinafter, such block values are referred to as simply "data"). A reference value ($\alpha$) shown in the graph is a center value of the numerical range of the block values, i.e., 2048 in this example.

As shown in the graph on the middle of FIG. 1, the average value ($\beta$) is generally different from the reference value ($\alpha$). In other words, there is generally a difference (see "offset value (OFF)") between the average value ($\beta$) and the reference value ($\alpha$) that needs to be compensated. The offset value (OFF) varies depending on various factors. Such factors can be a type of image data, i.e., whether the image data is a visible image or an infrared image, a type of paper sheet subject to the authenticity determination, a type of optical sensor used, environmental conditions at the time of the determination, and the like. However, when the authenticity determination is performed, it is required to determine whether the data of each of the blocks is within a predetermined allowable numerical range. Therefore, if the offset value (OFF), which is variable element depending on the average value ($\beta$), is large, it may cause a decrease in an accuracy of the authenticity determination.

To avoid such a problem, in the authenticity determining method according to the present invention, the data is corrected so that the average value ($\beta$) coincides with the reference value ($\alpha$) (see [1] in FIG. 1). Then, the authenticity of the paper sheet is determined based on the corrected data (see [2] in FIG. 1).

In this manner, in the authenticity determining method according to the present invention, a value of each of the blocks composing the image data 1 is corrected so that the offset value (OFF) becomes zero, i.e., the average value ($\beta$) is equal to the reference value ($\alpha$). Therefore, it is possible to eliminate an influence of the offset value (OFF) that easily varies depending on an objective sheet to be determined, a wavelength of light used, environmental conditions at the time of the determination, and the like.

The correction is performed on each of the data so as to be converted into data around the reference value ($\alpha$). Therefore, it is possible to determine whether each of the data is within the allowable numerical range without expanding the allowable numerical range immoderately.

Figure 11:
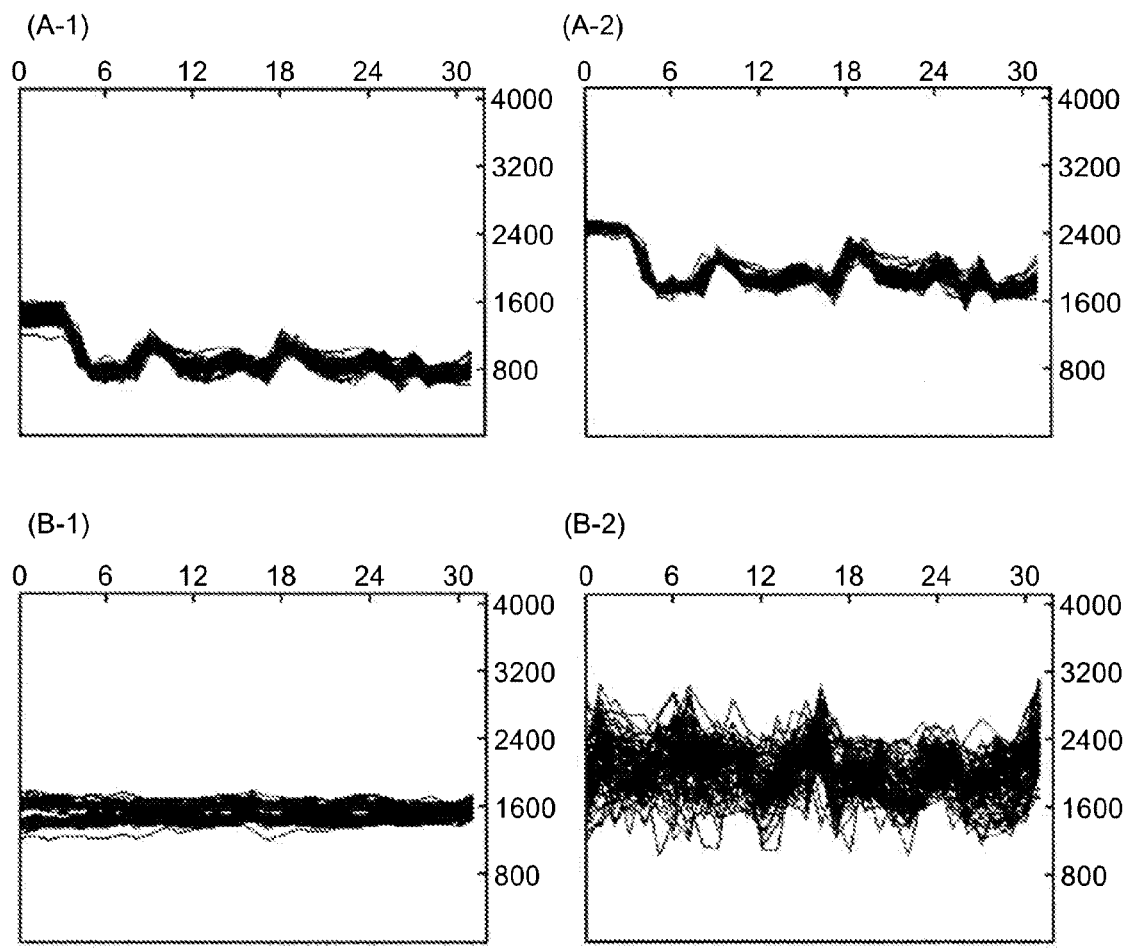
FIG. 11 shows graphs for explaining problems with a conventional authenticity determining method.

As comparison between the authenticity determining method according to the present invention and that of a conventional technology, problems of the conventional authenticity determining method will be explained below with reference to FIG. 11. FIG. 11 shows four graphs A-1, A-2, B-1, and B-2 obtained with the conventional authenticity determining method. Each of the graphs shows a plurality of sets of data obtained from a plurality of paper sheets all together.

The graph A-1 shows data on block values of the image (corresponding to the image data 1 in FIG. 1) when an acquired image is a high-contrast image. The graph A-2 shows data on a normalized block data that the block data which data is shown in the graph A-1 is normalized. As shown in the graphs A-1 and A-2, in a case of the high-contrast image, by the application of the normalization technique, the block data is shifted to around the center of the numerical range (i.e., around the center value of 2048).

On the other hand, the graph B-1 shows data on a block data of the image when an acquired image is a low-contrast image. The graph B-2 shows data on a normalized block data that the block data which data is shown in the graph B-1 is normalized. In a case of the low-contrast image, rise and fall of the original block data shown in the graph B-1 is smaller, so that a dispersion degree of the block data is increased due to the normalization process as shown in the graph B-2.

As described above, when the authenticity of a low-contrast image as an input image is determined with the conventional authenticity determining method, a dispersion degree of the block data is increased due to a normalization process. Therefore, it is difficult to determine the authenticity of the low-contrast image based on whether block data on the low-contrast image is within an allowable numerical range.

However, by the use of the authenticity determining method according to the present invention as explained above with reference to FIG. 1, it is possible to prevent a decrease in an accuracy of determining the authenticity of the low-contrast image, which is the problem in the conventional authenticity determining method. Thus, it is possible to determine the authenticity of the low-contrast image with high accuracy. Furthermore, in the authenticity determining method according to the present invention, it is not necessary to perform a complicated operation with a microfilter as described above, so that a processing load can be reduced.

Subsequently, exemplary embodiments of an authenticity determining apparatus employing the authenticity determining method according to the present invention will be explained in detail below. Incidentally, in the embodiments below, there is explained a case where the authenticity determining apparatus determines the authenticity of a paper sheet based on an infrared image of the paper sheet.

Figure 2:
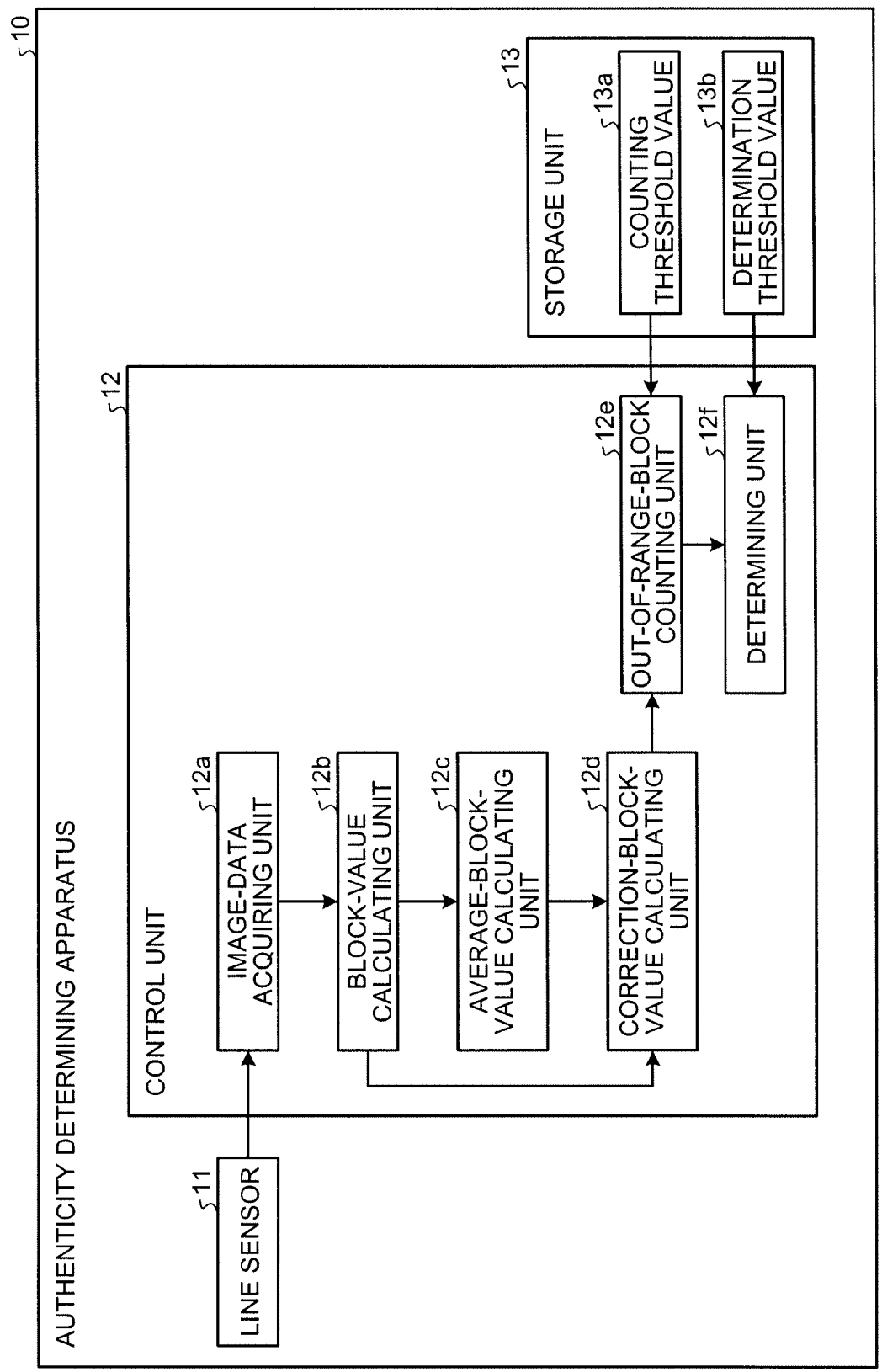
FIG. 2 is a block diagram of an authenticity determining apparatus according to a first embodiment of the present invention.

FIG. 2 is a block diagram of an authenticity determining apparatus 10 according to a first embodiment of the present invention. The authenticity determining apparatus 10 includes a line sensor 11, a control unit 12, and a storage unit 13. Incidentally, for the sake of explaining characteristics of the authenticity determining apparatus 10 simply, only main elements are depicted in FIG. 2, so that a conveying mechanism for conveying a paper sheet, a light source, and the like are omitted from FIG. 2.

The line sensor 11 receives a transmitted infrared light or a reflected infrared light from a paper sheet which is being conveyed by the conveying mechanism (not shown). The line sensor 11 is composed of a plurality of linearly-arranged light-receiving sensors. The line sensor 11 also outputs data acquired based on the received light to the control unit 12.

The control unit 12 includes an image-data acquiring unit 12a, a block-value calculating unit 12b, an average-block-value calculating unit 12c, a correction-block-value calculating unit 12d, an out-of-range-block counting unit 12e, and a determining unit 12f.

The storage unit 13 stores therein a counting threshold value 13a and a determination threshold value 13b.

The control unit 12 creates image data on an image of the paper sheet based on the data output from the line sensor 11. The control unit 12 divides the created image data into blocks, corrects a value of each of the blocks, and then determines the authenticity of the paper sheet based on the corrected block values.

The image-data acquiring unit 12a receives data from the line sensor 11, synthesizes the data, and creates image data on a whole image of one sheet paper. The image-data acquiring unit 12a also outputs the created image data to the block-value calculating unit 12b.

Figure 3:
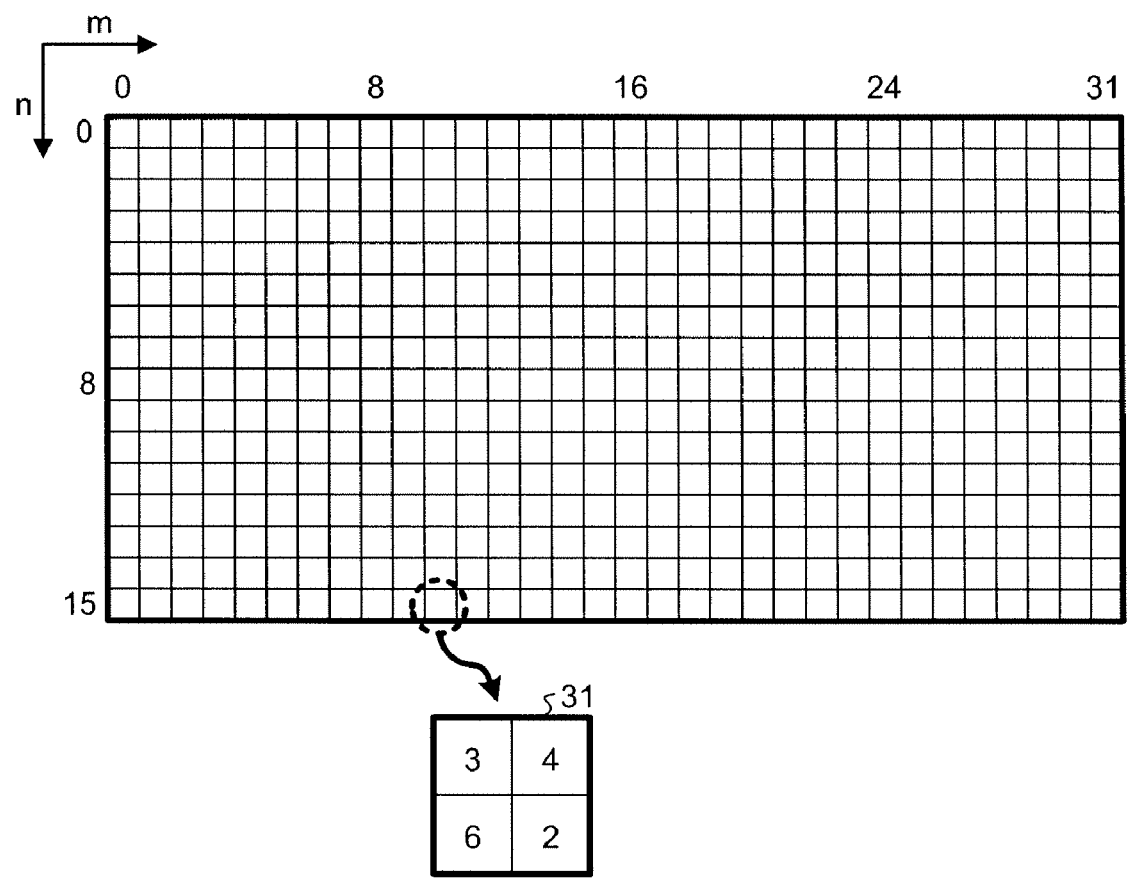
FIG. 3 is a schematic diagram for explaining a block-value calculating process performed by a block-value calculating unit shown in FIG. 2.

The block-value calculating unit 12b divides the image data into blocks, and calculates a pixel value corresponding to each of the blocks as shown in FIG. 3. A block-value calculating process performed by the block-value calculating unit 12b will be explained with reference to FIG. 3. In the example shown in FIG. 3, each block is composed of four pixels. However, the number of pixels in one block is not limited to four.

As shown in FIG. 3, the block-value calculating unit 12b divides the image data received from the image-data acquiring unit 12a into, for example, 512 blocks: 32 blocks in rows along an m-axis (m=0 to 31) and 16 blocks in columns along an n-axis (n=0 to 15).

For example, provided that a block denoted with a reference numeral 31 is composed of four pixels each having pixel values of "3", "4", "6", and "2". Namely, the block value of the block 31 is 15 (=3+4+6+2). A block value of a certain block is the total sum of values of the pixels composing the block. The block-value calculating unit 12b calculates each block value of the 512 blocks, and outputs those block values to both the average-block-value calculating unit 12c and the correction-block-value calculating unit 12d.

The average-block-value calculating unit 12c calculates an average block value of block values of blocks in a predetermined area of the image data. The average-block-value calculating unit 12c outputs the calculated average block value to the correction-block-value calculating unit 12d.

In the present embodiment, it is assumed that the whole image data is equally-divided into four sub-areas, and the average-block-value calculating unit 12c calculates an average block value for each of the sub-areas. However, the number of sub-areas can be any natural number equal to or more than one.

Based on the block values calculated by the block-value calculating unit 12b and the average block values calculated by the average-block-value calculating unit 12c, the correction-block-value calculating unit 12d corrects the block values so that each of the average block values is equal to a predetermined reference value (for example, 2048).

Specifically, when a block value is denoted by "B(m, n)" ("(m, n)" denotes the row number and the column number, see the m-axis and the n-axis in FIG. 3), an average block value is denoted by "β", and a reference value is denoted by "α", a corrected block value "C" can be expressed as follows:

$$C(m,n)=\alpha-\beta+B(m,n).$$

Incidentally, the correction-block-value calculating unit 12d calculates each average block value of partial area equally divided into four from the image data and a corrected block values of each of the blocks based on the corresponding average block value, i.e., any of the average block values corresponding to the sub-area in which the block is located. In this manner, the correction-block-value calculating unit 12d outputs the corrected block values to the out-of-range-block counting unit 12e.

The out-of-range-block counting unit 12e determines for each block whether the block value is out of an allowable numerical range (hereinafter, "an out-of-range block"). This determination is performed by comparing the corrected block value of the block with the counting threshold value 13a stored in the storage unit 13. The out-of-range-block counting unit 12e counts the number of out-of-range blocks in each of the sub-areas, and outputs the counted number of out-of-range blocks to the determining unit 12f.

Incidentally, the counting threshold value 13a is threshold value information including upper and lower threshold values. A range between the upper and lower threshold values is the allowable numerical range. Such an allowable numerical range is defined for each of blocks composing image data for each kind of paper sheets. Specifically, for each kind of paper sheets, statistics of corrected block values are taken from a plurality of the same kind of paper sheets. For example, even if the target paper sheet is stained or worn, the allowable numerical range of the kind of paper sheet can be set by the application of simulation analysis based on the statistics. It is also possible to set the allowable numerical range in multiple stages depending on a detection level of the line sensor 11.

An example of a relationship between block value and allowable numerical range will be explained below with reference to FIGS. 4A to 4C.

FIG. 4A is a schematic diagram of image data in which out-of-range blocks detected by the out-of-range-block counting unit 12e are blacked out. FIG. 4B is a graph showing a relationship between values of blocks in a column n=5 of the image data and allowable numerical range. FIG. 4C is a table showing the number of out-of-range blocks, average block value, a sum of absolute differences of block values for each of sub-areas, and determination threshold value (counting number).

As shown in FIG. 4A, the image data is equally divided into four sub-areas A, B, C, and D, and the number of out-of-range blocks detected in each of the sub-areas A, B, C, and D is four, eight, ten, and nine, respectively. A block whose block value is out of an allowable numerical range between upper and lower threshold values shown in FIG. 4B is detected as the out-of-range block.

For example, a block value of a block (m, n)=(28, 5) shown in FIG. 4A corresponds to a circled portion (B-1) in the graph shown in FIG. 4B. As shown in FIG. 4B, the block value of the block (m, n)=(28, 5) is higher than the upper threshold value, so that the block (m, n)=(28, 5) is detected as the out-of-range block. Incidentally, the block value is a corrected block value of which original block value is corrected by the correction-block-value calculating unit 12d. Therefore, although the original block value before correction is lower than the upper threshold value and within the allowable numerical range, the corrected block value is higher than the upper threshold value.

Figure 12:
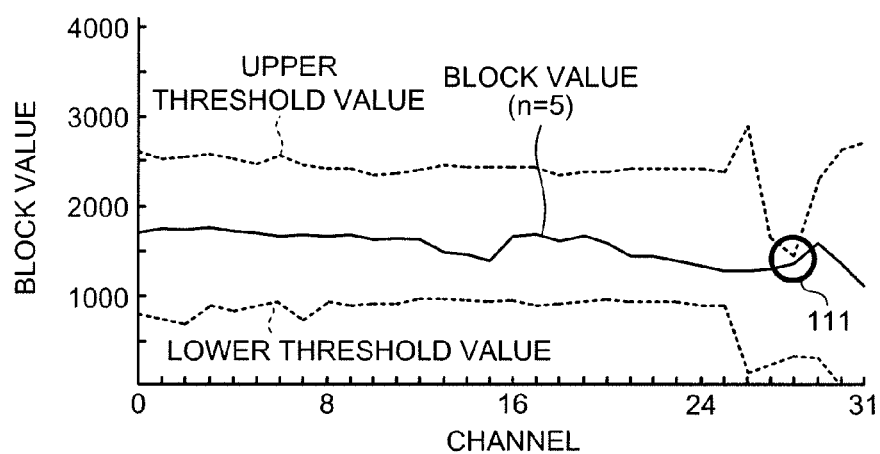
FIG. 12 is a graph showing a relationship between block value before correction and allowable numerical range.

For comparison, FIG. 12 shows a comparison result between the original block value before correction and the allowable numeral value range. As comparison between the corrected block value and the original block value before correction, block values of the blocks in the line n=5 that are not yet corrected by the correction-block-value calculating unit 12*d* are graphed out. An original block value of the block (m, n)=(28, 5) corresponds to a circled portion 111 in the graph shown in FIG. 12. As shown in FIG. 12, the original block value of the block (m, n)=(28, 5) is within the allowable numerical range between the upper and lower threshold values, so that the block (m, n)=(28, 5) cannot be detected as the out-of-range block.

The out-of-range-block counting unit 12*e* detects out-of-range blocks in each of the sub-areas, and counts the number of out-of-range blocks in each of the sub-areas. In the table shown in FIG. 4C, the number in "RESULT OF COUNTING" indicates a result of counting by the out-of-range-block counting unit 12*e*, i.e., the number of out-of-range blocks detected by the out-of-range-block counting unit 12*e* in each of the sub-areas A, B, C, and D.

In the table shown in FIG. 4C, the number in "AVE" indicates an average block value for each of the sub-areas A, B, C, and D, and the number in "TOTAL" indicates a sum of absolute differences of block values for each of the areas from the corresponding average block value, and the number in "DETERMINATION THRESHOLD VALUE" indicates the determination threshold value 13*b* used by the determining unit 12*f* to determine whether the number of out-of-range blocks exceeding an allowable number are detected in each of the sub-areas.

In this example, the number of "DETERMINATION THRESHOLD VALUE" comes to 5 in each of the sub-areas A, B, C, and D in case of 5 Euro bill as shown in FIG. 4(C). An example of a usage of the sum of absolute differences indicated by "TOTAL" will be explained later as a second embodiment of the present invention.

The determining unit 12*f* makes a final determination of whether the paper sheet is authentic or counterfeit by comparing the number of out-of-range blocks received from the out-of-range-block counting unit 12*e* with the determination threshold value 13*b* stored in the storage unit 13.

The determination threshold value 13*b* is, for example, a threshold value of the number of out-of-range blocks allowed in each of sub-areas. If the number of out-of-range blocks exceeding the determination threshold value 13*b* is detected in at least one of the sub-areas, the determining unit 12*f* determines that the paper sheet subject to the authenticity determination is a counterfeit.

The storage unit 13 includes a storage device (not shown), such as a memory or a hard disk drive (HDD). The storage unit 13 stores therein the counting threshold values 13*a* and the determination threshold values 13*b*. The counting threshold values 13*a* are threshold value information including upper and lower threshold values that are preliminarily set for each of types of paper sheets so as to define a numerical range (an allowable numerical range) of a block value for each of blocks in an authentic paper sheet.

Moreover, the determination threshold values 13*b* are threshold value information on an upper threshold value of the number of out-of-range blocks allowed in each of sub-areas composing image data. Alternatively, it is possible to detect the number of out-of-range blocks not in each sub-area but in all the sub-areas of the image data collectively. In this case, an upper threshold value of the number of out-of-range blocks allowed in all the sub-areas is stored as the determination threshold value 13*b*.

Figure 5:
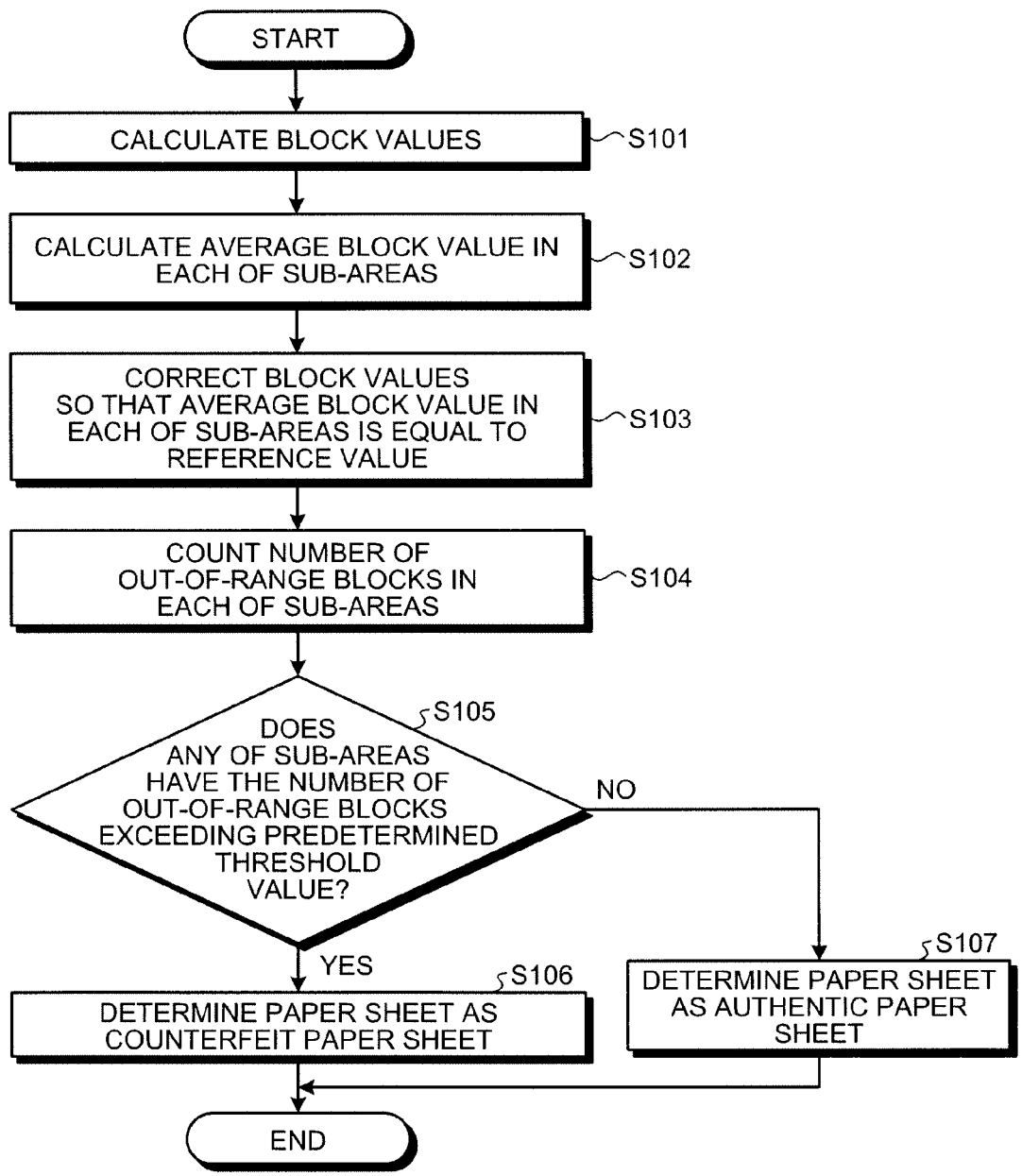
FIG. 5 is a flowchart of an example of an authenticity determining process performed by the authenticity determining apparatus shown in FIG. 2.

Subsequently, an authenticity determining process performed by the authenticity determining apparatus 10 will be explained below with reference to FIG. 5. FIG. 5 is a flowchart of an example of the authenticity determining process performed by the authenticity determining apparatus 10. The block-value calculating unit 12*b* calculates a block value of each of blocks composing image data of a paper sheet (Step S101). The average-block-value calculating unit 12*c* calculates an average block value of blocks for each of sub-areas that the image data is divided thereinto (Step S102).

The correction-block-value calculating unit 12*d* corrects each of the block values so that the corresponding average block value of each of the sub-areas is equal to a predetermined reference value (Step S103). Then, the out-of-range-block counting unit 12*e* counts the number of blocks whose corrected block value obtained at Step S103 is out of the allowable numerical range in each of the sub-areas (Step S104).

The determining unit 12*f* determines whether any of the sub-areas includes the number of out-of-range blocks exceeding a predetermined threshold value (Step S105). When any of the sub-areas includes the number of out-of-range blocks exceeding the predetermined threshold value (YES at Step S105), the determining unit 12*f* determines the paper sheet as a counterfeit paper sheet (Step S106). Then, the process is terminated. On the other hand, when no sub-area includes the number of out-of-range blocks exceeding the predetermined threshold value (NO at Step S105), the determining unit 12*f* determines the paper sheet as an authentic paper sheet (Step S107). Then, the process is terminated.

Incidentally, in the authenticity determining process shown in FIG. 5, provided that at least one of the sub-areas includes a number of out-of-range blocks exceeding the predetermined threshold value, the determining unit 12*f* determines the paper sheet as a counterfeit paper sheet. Alternatively, when the two or more sub-areas or all the sub-areas include a number of out-of-range blocks exceeding the predetermined threshold value, the determining unit 12*f* can determine the paper sheet as a counterfeit paper sheet.

Furthermore, in the authenticity determining process shown in FIG. 5, the correction-block-value calculating unit 12*d* corrects each of the block values so that the corresponding average block value in each of the sub-areas is equal to the reference value. Alternatively, the correction-block-value calculating unit 12*d* can correct each of the block values with due consideration of a fluctuation in the block values with respect to the reference value. The authenticity determining process including such a correction process with due consideration of the fluctuation in the block values with respect to the reference value will be explained below with reference to FIG. 6.

Figure 6:
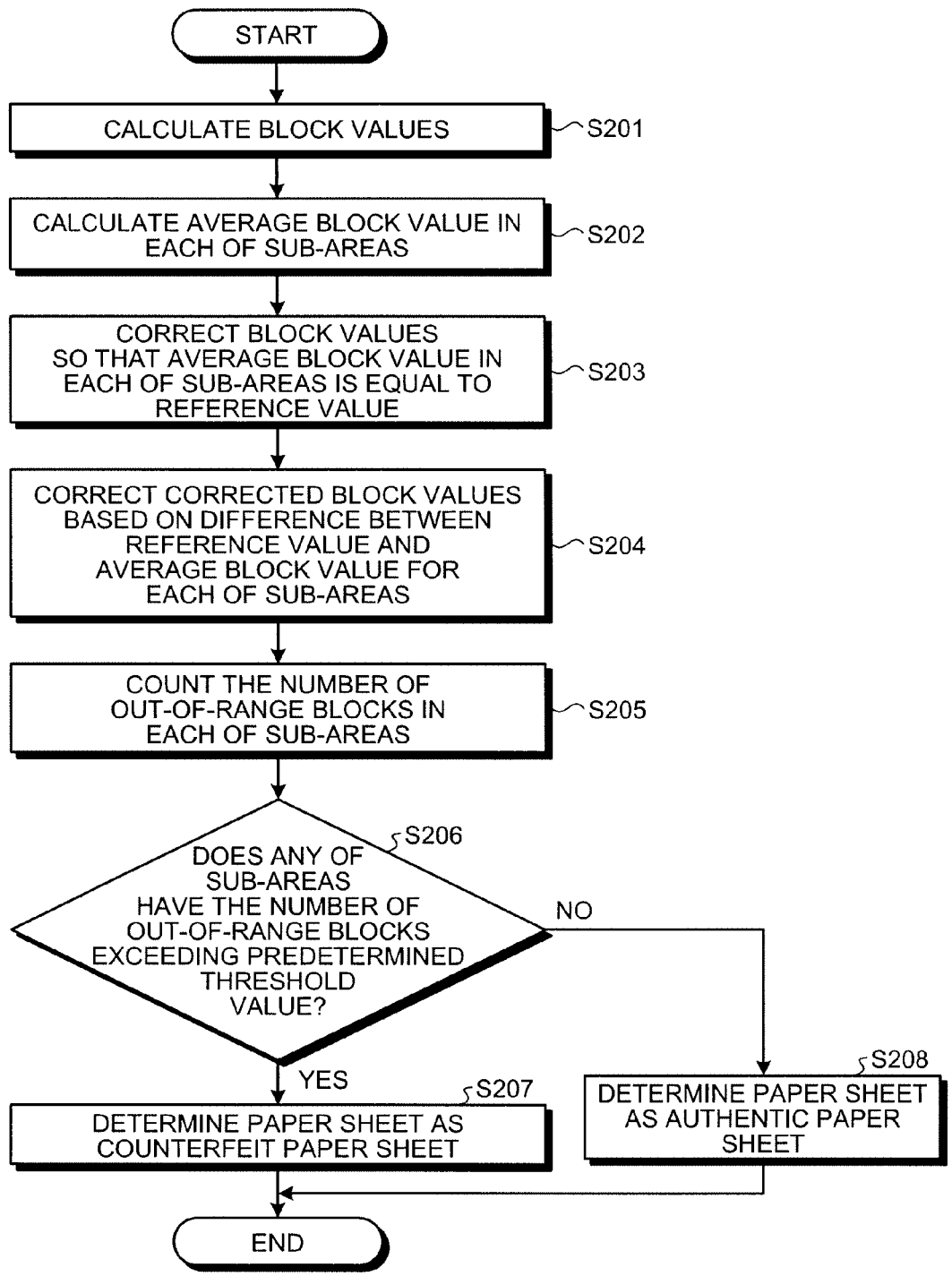
FIG. 6 is a flowchart of another example of the authenticity determining process shown in FIG. 5.

FIG. 6 is a flowchart of another example of the authenticity determining process. The block-value calculating unit 12*b* calculates a block value of each of blocks composing image data on an image of a paper sheet (Step S201). Then, the average-block-value calculating unit 12*c* calculates an average block value of blocks in each of sub-areas that the image data is divided thereinto (Step S202).

Subsequently, the correction-block-value calculating unit 12*d* corrects each of the block values so that the corresponding average block value in each of the sub-areas is equal to the reference value (Step S203). The correction-block-value calculating unit 12*d* further corrects each of the corrected block values based on corresponding difference between the reference value and the average block value for each of the sub-areas (Step S204).

Specifically, the correction-block-value calculating unit 12*d* calculates a difference between the reference value and the average block value in each of the sub-areas, and corrects each of the corrected block values so that as a value of the average block value subtracted by the reference value gets larger in a negative direction, a difference between each of the block values and the reference value gets larger. Herewith, as the average block value gets larger from the reference value, each of the corrected block values can be corrected so that a degree of the fluctuation in the block values gets smaller. Conversely, as the average block value gets smaller from the reference value, each of the corrected block values is corrected so that a degree of the fluctuation in the block values gets larger.

Alternatively, the correction-block-value calculating unit 12d can calculate an absolute value of a difference between the reference value and the average block value for each of the sub-areas, and may multiply each of the block values by a value proportional to the calculated absolute value.

The out-of-range-block counting unit 12e counts the number of blocks that the corrected block value of which obtained at Step S204 is out of the allowable numerical range in each of the sub-areas (Step S205).

The determining unit 12f determines whether any of the sub-areas includes a number of out-of-range blocks exceeding a predetermined threshold value (Step S206). When any of the sub-areas includes the number of out-of-range blocks exceeding the predetermined threshold value (YES at Step S206), the determining unit 12f determines the paper sheet as a counterfeit paper sheet (Step S207). Then, the process is terminated. On the other hand, when no sub-area includes the number of out-of-range blocks exceeding the predetermined threshold value (NO at Step S206), the determining unit 12f determines the paper sheet as an authentic paper sheet (Step S208). Then, the process is terminated.

Incidentally, at Step S204 in the authenticity determining process shown in FIG. 6, each of the corrected block values is further corrected based on a difference between the reference value and the average block value. Alternatively, instead of correcting each of the block values, the allowable numerical range may be corrected.

The correction of each of the block values at Step S204 in FIG. 6 and an alternative example of the block value correction is explained with reference to a table 1 shown in FIG. 7. A correction of the allowable numerical range to be performed instead of the correction of each of the block values is explained with reference to a table 2 shown in FIG. 7. Incidentally, it is assumed that a reference value ($\alpha$) is set to 2048 in the example shown in FIG. 7.

As shown in the table 1 in FIG. 7, when each of the block values is to be corrected, each of the block values is multiplied by a correction ratio corresponding to a difference ($\beta-\alpha$) between an average value ($\beta$) and the reference value ($\alpha$). Specifically, the correction ratio shall be 1.0 when the average value ($\beta$) is equal to the reference value ($\alpha$), 0.9 when the average value ($\beta$) is larger than the reference value ($\alpha$) by 1000, and 1.1 when the average value ($\beta$) is smaller than the reference value ($\alpha$) by 1000.

Incidentally, when the average value ($\beta$) is an intermediate value, the correction ratio shown in the table 1 is divided proportionally. For example, when the average value ($\beta$) is larger than the reference value ($\alpha$) by 500, the correction ratio is 0.95.

As shown in the table 2 in FIG. 7, when the allowable numerical range is to be corrected, a width of the allowable numerical range is multiplied by a correction ratio corresponding to the difference ($\beta-\alpha$). Specifically, the correction ratio shall be 1.0 when the average value ($\beta$) is equal to the reference value ($\alpha$), 1.1 when the average value ($\beta$) is larger than the reference value ($\alpha$) by 1000, and 0.9 when the average value ($\beta$) is smaller than the reference value ($\alpha$) by 1000.

Incidentally, when the average value ($\beta$) is an intermediate value, the correction ratio shown in the table (2) is divided proportionally. For example, when the average value ($\beta$) is larger than the reference value ($\alpha$) by 500, the correction ratio is 1.05.

In the authenticity determining process shown in FIGS. 5 and 6, the correction of each of the block values is performed for each of the sub-areas. Alternatively, the correction of each of the block values can be performed on all the sub-areas of the image data instead of for each sub-area. Such a block-value correcting process aimed at all the sub-areas will be explained below with reference to FIG. 8.

Figure 8:
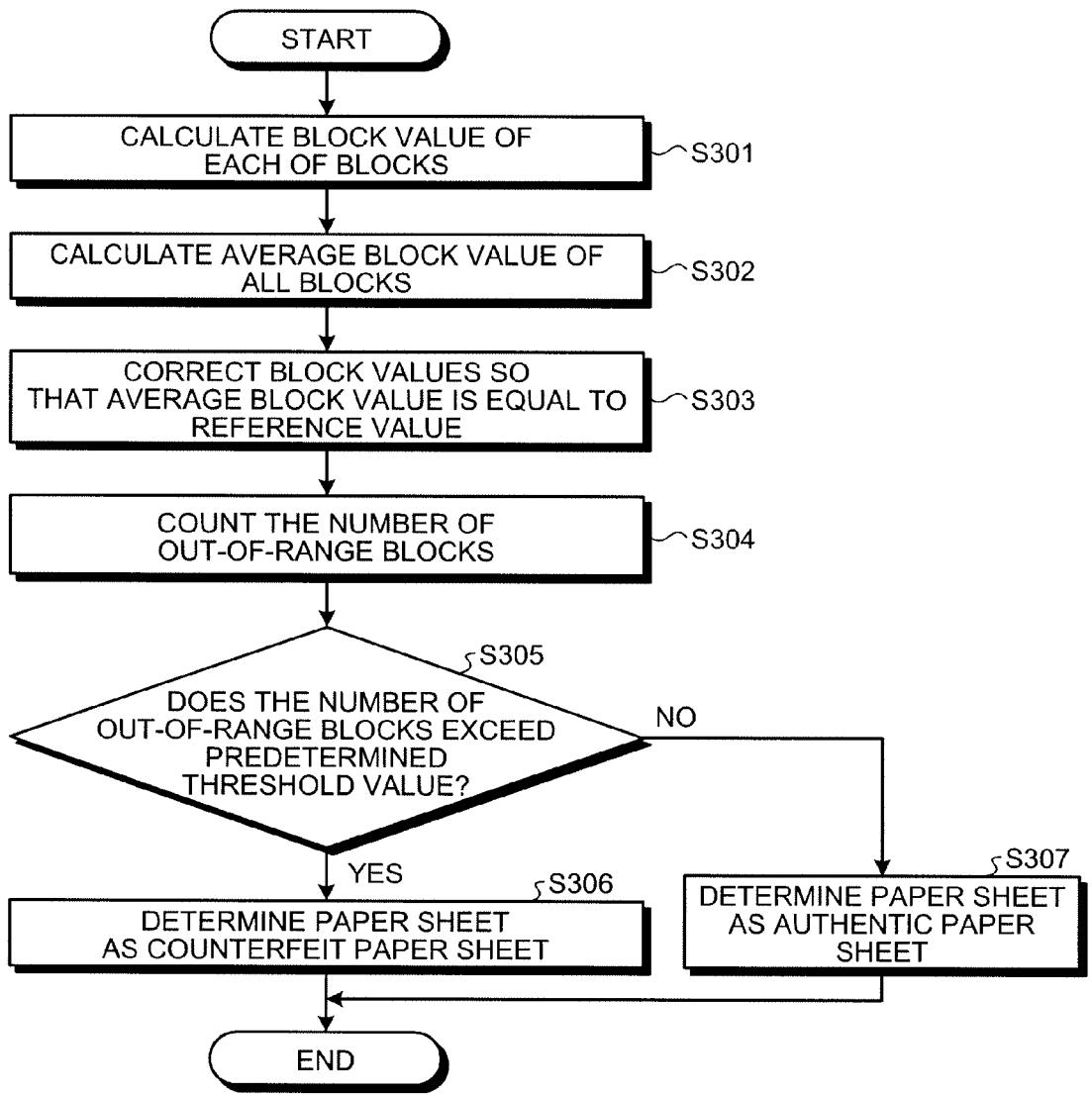
FIG. 8 is a flowchart of still another example of the authenticity determining process shown in FIG. 5.

FIG. 8 is a flowchart of still another example of the authenticity determining process shown in FIG. 5.

The block-value calculating unit 12b calculates a block value of each of blocks composing image data on an image of a paper sheet (Step S301). The average-block-value calculating unit 12c calculates an average block value of all the blocks in the image data (Step S302).

Subsequently, the correction-block-value calculating unit 12d corrects each of the block values so that the average block value is equal to a predetermined reference value (Step S303). The out-of-range-block counting unit 12e counts the number of blocks of which corrected block value is obtained at Step S303 is out of the allowable numerical range (Step S304).

The determining unit 12f determines whether the number of out-of-range blocks exceeds a predetermined threshold value (Step S305). When the number of out-of-range blocks exceeds the predetermined threshold value (YES at Step S305), the determining unit 12f determines the paper sheet as a counterfeit paper sheet (Step S306). Then, the process is terminated. On the other hand, when the number of out-of-range blocks does not exceed the predetermined threshold value (NO at Step S305), the determining unit 12f determines the paper sheet as an authentic paper sheet (Step S307). Then, the process is terminated. Incidentally, each of the corrected block values can be further corrected based on a difference between the reference value and the average block value for whole image areas shown in FIG. 7 in the same manner as at Step S204 shown in FIG. 6.

As described above, in the authenticity determining apparatus according to the first embodiment, the image-data acquiring unit acquires image data on an image of a paper sheet based on a reflected light from the paper sheet irradiated with an infrared light; the block-value calculating unit 12b calculates a block value of each of blocks that the image data is divided thereto, i.e., the total sum of values of the predetermined number of pixels composing each of the blocks; the average-block-value calculating unit 12c calculates an average block value of blocks included in a predetermined area of the image data; the correction-block-value calculating unit 12d corrects a corrected block value of each of the blocks so that the average block value is equal to a predetermined reference value; and the determining unit 12f determines whether the paper sheet is authentic or counterfeit based on whether each of the calculated corrected block values is within a predetermined numerical range that is preliminarily defined for each of the blocks. Therefore, the authenticity determining apparatus 10 can determine the authenticity of a low-contrast image of a paper sheet with high accuracy at low cost.

In the first embodiment, the authenticity of a paper sheet is determined based on the corrected block values. In addition, it is also possible to employ a method of evaluating image data in a large sense. The second example where an authenticity determining apparatus according to a second embodiment of the present invention combines the method of evaluating image data in a large sense with the authenticity determining method according to the first embodiment, will be described.

Figure 9:
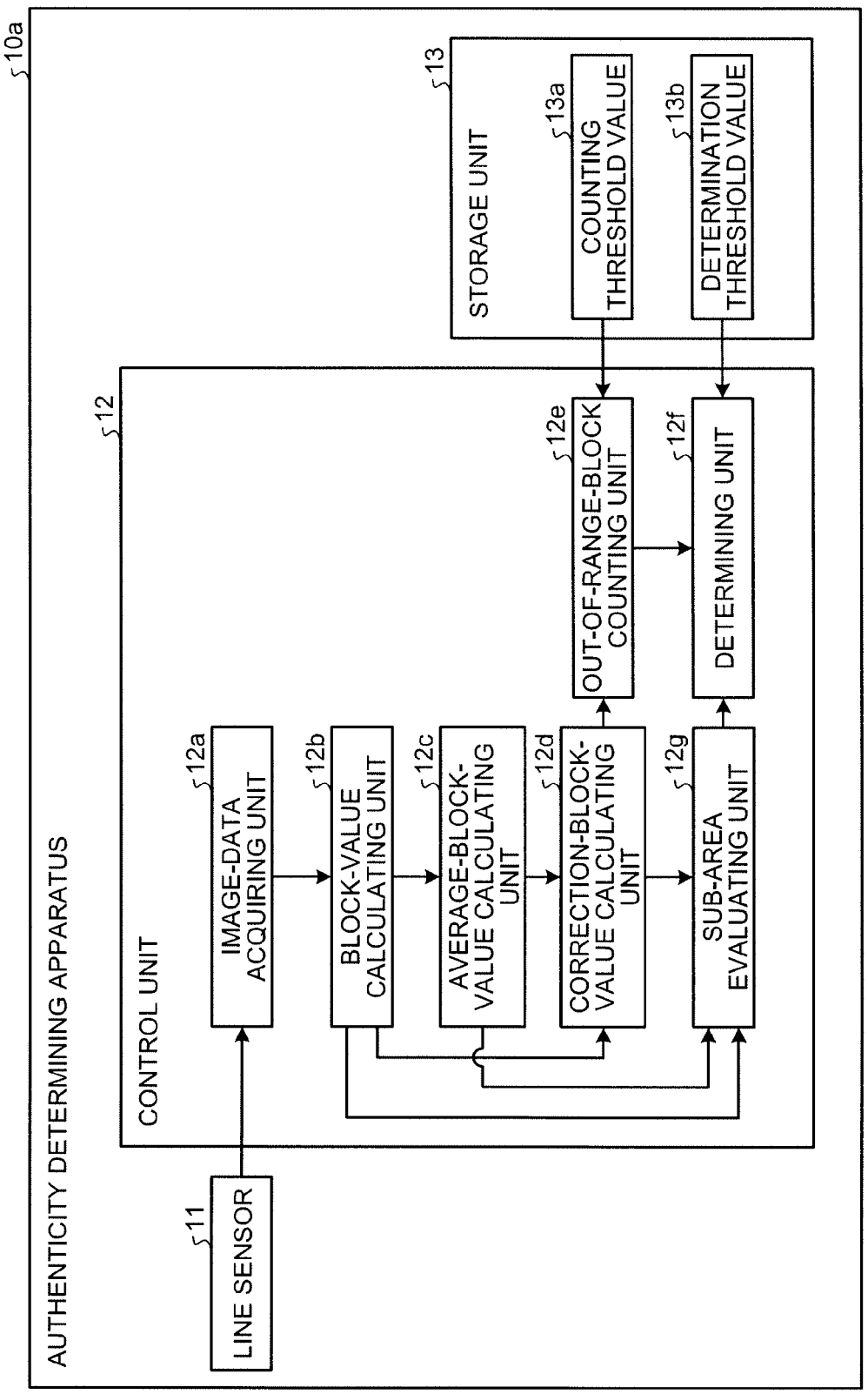
FIG. 9 is a block diagram of an authenticity determining apparatus according to a second embodiment of the present invention.

FIG. 9 shows a configuration of a block diagram of an authenticity determining apparatus 10a according to the second embodiment. In addition, the portions identical to those in FIG. 2 for the first embodiment are denoted with the same reference numerals, and the description of those portions are omitted.

A difference between the authenticity determining apparatuses 10 and 10a is that the control unit 12 of the authenticity determining apparatus 10a further includes a sub-area evaluating unit 12g as shown in FIG. 9. The sub-area evaluating unit 12g performs a simple evaluation of each of sub-areas (see FIG. 4A) based on whether an average block value or a sum of absolute differences (see "TOTAL" in the table shown in FIG. 4C) in each of the sub-areas is within a predetermined numerical range.

Indecently, the sum of absolute differences is the sum of the absolute value of the difference between the block value and the corresponding average block value in each of the sub-areas. Provided that a sum of the absolute differences is within an allowable numerical range, the sub-area evaluating unit 12g evaluates the corresponding sub-area as that of "the authentic paper sheet" (the evaluation based on a sum of the absolute differences).

Furthermore, provided that the average block value of the corresponding sub-area is within the allowable numerical range, the sub-area evaluating unit 12g evaluates the corresponding sub-area as that of "the authentic paper sheet" (the evaluation based on the average block value).

Provided that both results of "the evaluation based on the sum of the absolute differences" and "the evaluation based on the average block value" are "the authentic paper sheet", the sub-area evaluating unit 12g makes a simple evaluation of the sub-area as that of "the authentic paper sheet". However, the present invention is not limited to the above conditions. For example, provided that either a result of any one of "the evaluation based on the sum of the absolute differences" or "the evaluation based on the average block value" is "the authentic paper sheet", the sub-area evaluating unit 12g may make a simple evaluation of the sub-area as that of "the authentic paper sheet".

In this manner, the sub-area evaluating unit 12g performs a simple evaluation of each of the sub-areas, and outputs a result of the simple evaluation to the determining unit 12f. Upon receiving the results of the simple evaluation for all the sub-areas from the sub-area evaluating unit 12g, the determining unit 12f makes a final determination based on the results of the simple evaluation from the sub-area evaluating unit 12g and a comparison result of the number of out-of-range blocks with the determination threshold value 13b stored in the storage unit 13 as described in the first embodiment.

For example, even if the comparison result of the number of out-of-range blocks with the determination threshold value 13b shows "the authentic paper sheet", when the results of the simple evaluation shows "the counterfeit paper sheet", the determining unit 12f makes a final determination of the paper sheet as "the counterfeit paper sheet".

Figure 10:
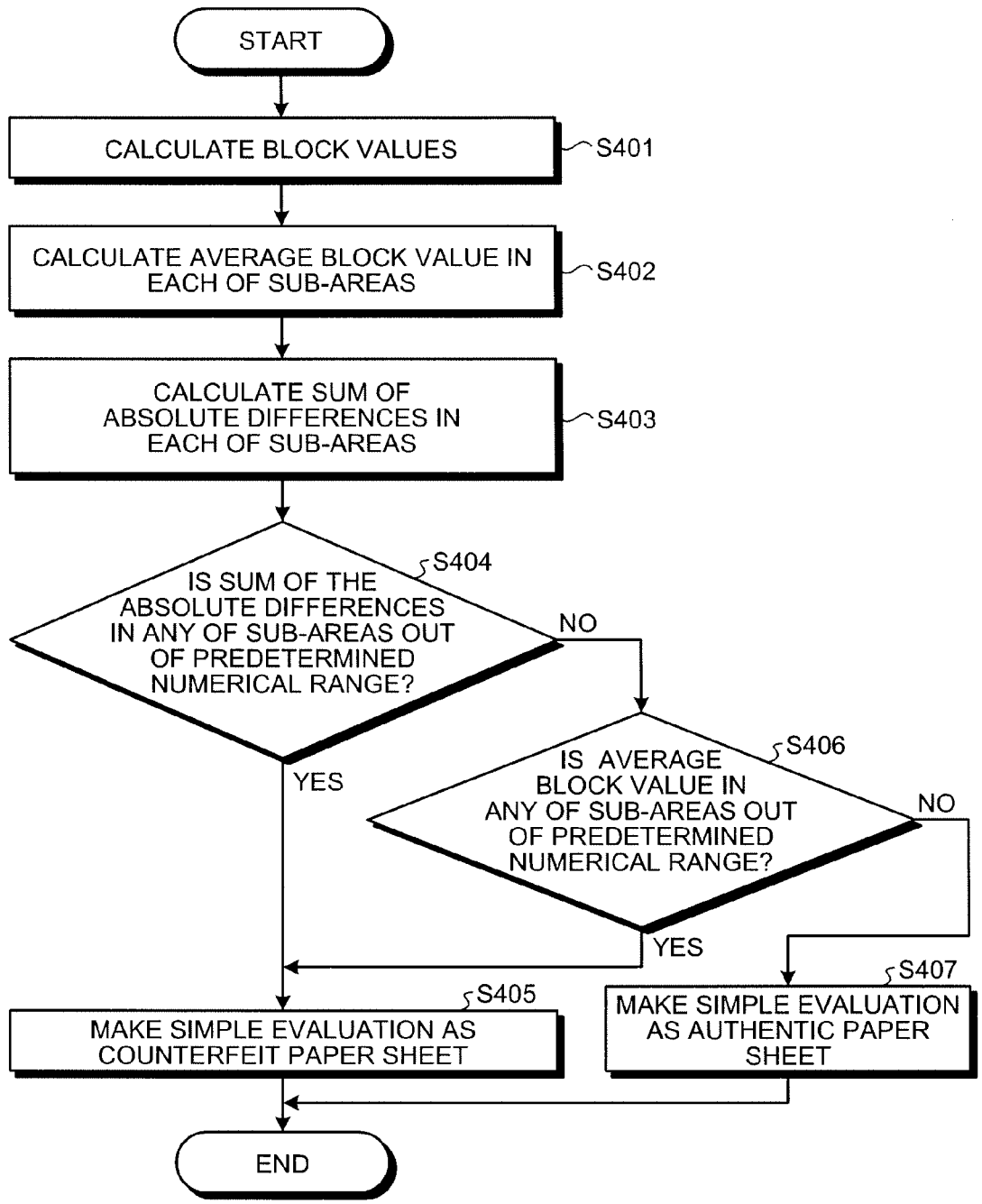
FIG. 10 is a flowchart of a sub-area evaluating process performed by a sub-area evaluating unit shown in FIG. 9.

A sub-area evaluating process performed by the sub-area evaluating unit 12g is explained below with reference to FIG. 10. FIG. 10 shows a flowchart of the sub-area evaluating process. As shown in the FIG. 10 block-value calculating unit 12b calculates a block value of each of blocks composing image data of a paper sheet (Step S401). Then, the average-block-value calculating unit 12c calculates an average block value of blocks in each of sub-areas that the image data is divided thereinto (Step S402).

The sub-area evaluating unit 12g calculates a sum of the absolute differences of the block values from the corresponding the average block value in each of the sub-areas (Step S403). The sub-area evaluating unit 12g determines whether the sum of absolute differences in any of the sub-areas is out of a predetermined numerical range (Step S404). When the sum of the absolute differences in a sub-area is out of the predetermined numerical range (YES at Step S404), the sub-area evaluating unit 12g determines a simple evaluation of the paper sheet as "the counterfeit paper sheet" (Step S405). Then, the process is terminated.

On the other hand, when the sum of the absolute differences in any of the sub-areas is not out of the predetermined numerical range (NO at Step S404), the sub-area evaluating unit 12g determines whether the average block value in any of the sub-areas is out of a predetermined numerical range (Step S406). When the average block value in a sub-area is out of the predetermined numerical range (YES at Step S406), the sub-area evaluating unit 12g determines a simple evaluation of the paper sheet as "the counterfeit paper sheet" (Step S405). Then, the process is terminated. When the average block value in any of the sub-areas is not out of the predetermined numerical range (NO at Step S406), the sub-area evaluating unit 12g determines a simple evaluation of the paper sheet as "the authentic paper sheet" (Step S407). Then, the process is terminated.

Incidentally, in the sub-area evaluating process shown in FIG. 10, provided that both the sum of the absolute difference in any of the sub-areas is not out of the predetermined numerical range and the average block value in any of the sub-areas is not out of the predetermined numerical range, the sub-area evaluating unit 12g determines a simple evaluation of the paper sheet as "the authentic paper sheet". Alternatively, the sub-area evaluating unit 12g may perform a simple evaluation of each of the sub-areas, and output a result of the simple evaluation of each of the sub-areas to the determining unit 12f. In this case, the determining unit 12f can combine the results of the simple evaluations for each of the sub-areas with the authentic determination for each sub-area.

In this manner, in the authenticity determining apparatus according to the second embodiment, the determining unit in a large sense makes a final determination of whether a paper sheet is authentic or counterfeit based on a result of simple evaluation by the sub-area evaluating unit. Therefore, the authenticity determining apparatus 10 can improve accuracy of the authenticity determination by combining the result of the comprehensive evaluation.

According to an aspect of the present invention, it is possible to determine the authenticity of a low-contrast image with high accuracy at low cost.

Furthermore, according to another aspect of the present invention, it is possible to perform the authenticity determination in a simple and easy way.

Moreover, according to still another aspect of the present invention, a value of each of blocks composing image data can be corrected depending on characteristics of each of sub-areas that the image data is divided thereinto. Therefore, for example, in a case of a paper sheet of which a specific sub-area has unique features, it is possible to determine the authenticity of the paper sheet efficiently.

Furthermore, according to still another aspect of the present invention, without correcting a value of data, data far from a reference value can be treated as data having lower reliability than that of data around the reference value.

Moreover, according to still another aspect of the present invention, it is possible to determine the authenticity of a paper sheet simply and comprehensively, and thereby an accuracy of the authenticity determination is improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An authenticity determining apparatus comprising:
    an image-data acquiring unit that acquires image data on an image of a paper sheet based on a reflected light from the paper sheet irradiated with an infrared light;
    a block-value calculating unit that divides the image data into a plurality of blocks each of which is composed of a plurality of pixels and calculates a block value of each of blocks;
    an average-block-value calculating unit that calculates an average block value of blocks in a predetermined area of the image data;
    a correction-block-value calculating unit that calculates a corrected block value of each of the blocks by correcting each of the block values so that the average block value is equal to a predetermined reference value; and
    an authenticity determining unit that determines authenticity of the paper sheet based on whether each of corrected block values of the blocks composing the predetermined area is within a predetermined allowable numerical range that is preliminarily defined for the predetermined area.

2. The authenticity determining apparatus according to claim 1, wherein the authenticity determining unit determines authenticity of the paper sheet based on the number of blocks of which corrected block value is out of the allowable numerical range.

3. The authenticity determining apparatus according to claim 1, wherein the correction-block-value calculating unit divides the image data into a plurality of areas each including a plurality of blocks, and calculates a corrected block value of each of the blocks in each of the areas by correcting each of the block values based on the reference value corresponding to each of the areas.

4. The authenticity determining apparatus according to claim 1, wherein the correction-block-value calculating unit calculates a corrected block value of each of the blocks so that a difference between each of the block values and the reference value gets larger as a value of the average block value subtracted by the reference value gets larger in a negative direction.

5. The authenticity determining apparatus according to claim 1, wherein the authenticity determining unit adjusts the allowable numerical range so that the allowable numerical range becomes wider as a value of the average block value subtracted by the reference value gets larger in a positive direction and the allowable numerical range becomes narrower as a value of the average block value subtracted by the reference value gets larger in a negative direction.

6. The authenticity determining apparatus according to claim 1, wherein the authenticity determining unit determines the authenticity of the paper sheet based on at least one of the average block value and a sum of absolute differences of the block values of the blocks composing the predetermined area.

7. An authenticity determining method comprising:
    acquiring image data on an image of a paper sheet based on a reflected light from the paper sheet irradiated with an infrared light;
    dividing the image data into a plurality of blocks each composed of a plurality of pixels and calculating a block value of each of blocks;
    first calculating including calculating an average block value of blocks composing a predetermined area of the image data;
    second calculating including calculating a corrected block value of each of the blocks by correcting each of the block values so that the average block value is equal to a predetermined reference value; and
    determining authenticity of the paper sheet based on whether each of corrected block values of the blocks composing the predetermined area is within a predetermined allowable numerical range that is preliminarily defined for the predetermined area.

8. The authenticity determining method according to claim 7, wherein the determining includes determining authenticity of the paper sheet based on the number of blocks of which corrected value is out of the allowable numerical range.

9. The authenticity determining method according to claim 7, wherein the second calculating includes dividing the image data into a plurality of areas each including a plurality of blocks, and calculating a corrected block value of each of the blocks in each of the areas by correcting each of the block values based on the reference value corresponding to each of the areas.

10. The authenticity determining method according to claim 7, wherein the second calculating includes calculating a corrected block value of each of the blocks so that a difference between each of the block values and the reference value gets larger as a value of the average block value subtracted by the reference value gets larger in a negative direction.

11. The authenticity determining method according to claim 7, wherein the determining includes adjusting the allowable numerical range so that the allowable numerical range becomes wider as a value of the average block value subtracted by the reference value gets larger in a positive direction and the allowable numerical range becomes narrower as a value of the average block value subtracted by the reference value gets larger in a negative direction.

12. The authenticity determining method according to claim 7, wherein the determining includes determining the authenticity of the paper sheet based on at least one of the average block value and a sum of absolute differences of the block values of the blocks composing the predetermined area.

* * * * *